(12) United States Patent
Tonouchi

(10) Patent No.: US 7,657,095 B2
(45) Date of Patent: Feb. 2, 2010

(54) INFORMATION PROCESSING APPARATUS, METHOD AND PROGRAM

(75) Inventor: Yojiro Tonouchi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 706 days.

(21) Appl. No.: 11/387,967

(22) Filed: Mar. 24, 2006

(65) Prior Publication Data

US 2006/0279552 A1    Dec. 14, 2006

(30) Foreign Application Priority Data

Jun. 14, 2005    (JP) .............................. 2005-173953

(51) Int. Cl.
*G06K 9/00* (2006.01)
(52) U.S. Cl. .................................... 382/187
(58) Field of Classification Search ................ 382/151, 382/185–189, 209, 218; 345/156
See application file for complete search history.

(56) References Cited

U.S. PATENT DOCUMENTS

| | | | | |
|---|---|---|---|---|
| 5,835,632 | A * | 11/1998 | Takasu et al. ............... | 382/185 |
| 2005/0021960 | A1 * | 1/2005 | McKeeth ..................... | 713/170 |
| 2005/0069149 | A1 * | 3/2005 | Takahashi et al. .............. | 381/91 |
| 2006/0061599 | A1 * | 3/2006 | Yu et al. ..................... | 345/649 |

FOREIGN PATENT DOCUMENTS

| | | |
|---|---|---|
| JP | 9-269974 | 10/1997 |
| JP | 10-207490 | 8/1998 |
| WO | WO 2005/019919 A1 * | 3/2005 |

OTHER PUBLICATIONS

Youngho Lee, et al., "A Study on the English Signature Verification Using Tree Matching", IEICE Transactions, D-II, vol. J75-D-II, No. 1, Jan. 1992, pp. 31-38.
"Sound System and Digital Signal Processing", Corona Publishing, (ISBN 4-88552-128-9), Mar. 1995, pp. 173-218.
Frontiers of Research & Development, vol. 59, No. 8, 2004, pp. 54-55; http://www.toshiba.co.jp/tech/review/2004/08/59-08pdf/rd2.pdf.

* cited by examiner

*Primary Examiner*—Daniel G Mariam
(74) *Attorney, Agent, or Firm*—Oblon, Spivak, McClelland, Maier & Neustadt, L.L.P.

(57) ABSTRACT

An information processing apparatus includes a display acquisition unit including a display screen which displays information to a user, and an acquisition unit configured to acquire an input pattern written by the user, a storage unit which prestores, as a registered pattern, a pattern corresponding to the input pattern, a comparison unit configured to compare a shape and orientation of the input pattern with a shape and orientation of the registered pattern, a computation unit configured to compute a degree of difference between the orientation of the input pattern and the orientation of the registered pattern, and a selection unit configured to select a display orientation of a display target corresponding to the input pattern, displayed on the display screen, from a plurality of display orientations determined by a shape of the information processing apparatus, based on the computed degree of difference.

19 Claims, 14 Drawing Sheets

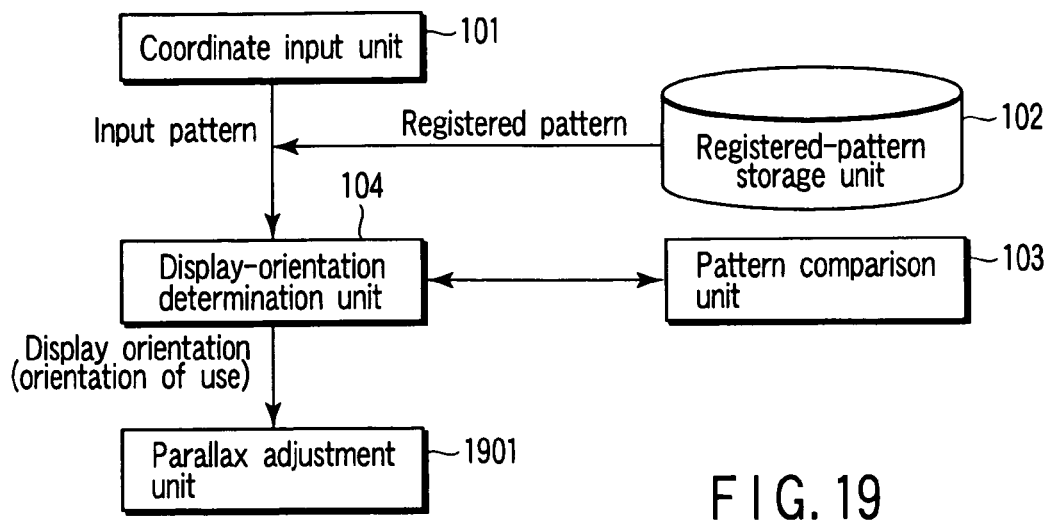
F I G. 19
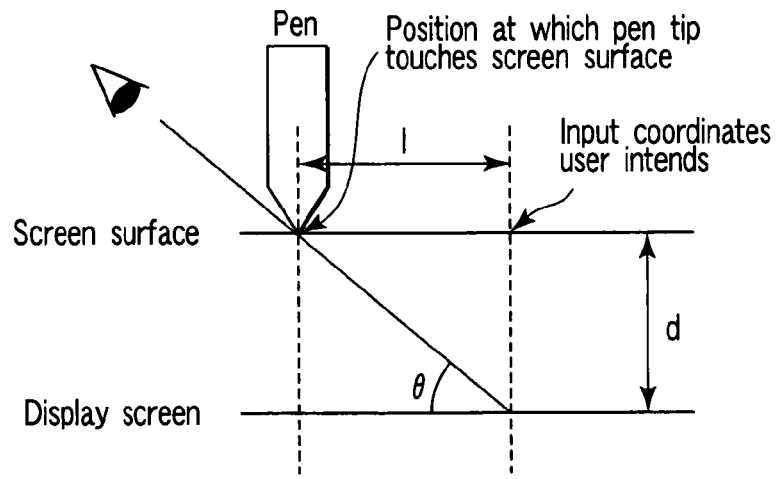
F I G. 20
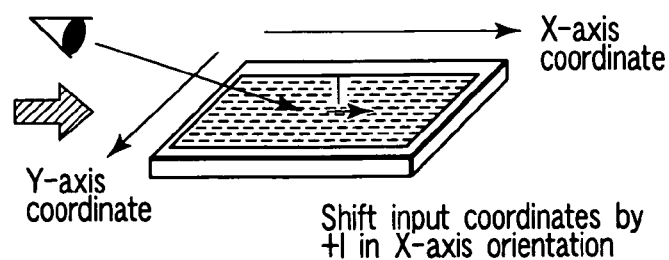
F I G. 21

INFORMATION PROCESSING APPARATUS, METHOD AND PROGRAM

CROSS-REFERENCE TO RELATED APPLICATIONS

This application is based upon and claims the benefit of priority from prior Japanese Patent Application No. 2005-173953, filed Jun. 14, 2005, the entire contents of which are incorporated herein by reference.

BACKGROUND OF THE INVENTION

1. Field of the Invention

The present invention relates to an information processing apparatus for controlling image display utilizing pattern comparison. More particularly, it relates to an information processing apparatus, such as a tablet computer, mobile information terminal or word processor, in which an input operation is performed using a coordinate input unit, such as a touch panel or tablet, formed integrally with its display screen. It also relates to an information processing method and program for use in the apparatus.

2. Description of the Related Art

In general, information processing apparatuses can be used in an arbitrary orientation since a direct coordinate input operation can be performed using an input device formed integrally with the display screen. However, image display by the information processing apparatuses is controlled, assuming that it is performed in a certain orientation. Accordingly, the orientation of image display may be different from the orientation of use, which is inconvenient for users.

In the prior art, the orientation of image display is controlled, for example, as follows:

1. The orientation of display set before the apparatus is turned off is recorded, and when the apparatus is again turned on, the orientation of display is set as recorded.

2. If the orientation of display differs from that of use, a screen rotation utility program is used to adjust the display orientation to the user's desired one.

In the case of item 2, it is necessary for the user to use the screen rotation utility program to switch the display orientation each time the orientation of use is changed.

When, in particular, the apparatus is turned on, the orientation of use is likely to differ from that of display. For instance, in the case of a tablet PC, when personal verification is performed for log in by inputting a signature upon turn-on of the PC, the orientation of use is likely to differ from that of display (see, for example, "A study on the English Signature Verification Using Tree Matching", IEICE Transactions D-II, Vol. J75-D-II, No. 1, pp. 31-38, January, 1992 (Signature Verification)).

If the orientation of use differs from that of display, users must rotate the apparatus to adjust the former to the latter.

Even if the orientation of display can be changed using the screen rotation utility program, they must designate the orientation of use.

BRIEF SUMMARY OF THE INVENTION

In accordance with a first aspect of the invention, there is provided an information processing apparatus comprising: a display acquisition unit including a display screen which displays information to a user, and an acquisition unit configured to acquire an input pattern written by the user; a storage unit which prestores, as a registered pattern, a pattern corresponding to the input pattern; a comparison unit configured to compare a shape and orientation of the input pattern with a shape and orientation of the registered pattern; a computation unit configured to compute a degree of difference between the orientation of the input pattern and the orientation of the registered pattern; and a selection unit configured to select a display orientation of a display target corresponding to the input pattern, displayed on the display screen, from a plurality of display orientations determined by a shape of the information processing apparatus, based on the computed degree of difference.

In accordance with a second aspect of the invention, there is provided an information processing method comprising: preparing a display acquisition unit which includes a display screen displaying information to a user, and an acquisition unit configured to acquire an input pattern written by the user; preparing a storage unit which prestores, as a registered pattern, a pattern corresponding to the input pattern; comparing a shape and orientation of the input pattern with a shape and orientation of the registered pattern; computing a degree of difference between the orientations of the input pattern and the orientation of the registered pattern; and selecting a display orientation of a display target corresponding to the input pattern, displayed on the display screen, from a plurality of display orientations determined by a shape of the information processing apparatus, based on the computed degree of difference.

In accordance with a third aspect of the invention, there is provided a computer program stored in a computer readable medium comprising: means for instructing a computer to display information on a display screen for a user, and to acquire an input pattern written on the display screen by the user; means for instructing the computer to prestore, as a registered pattern, a pattern corresponding to the input pattern; means for instructing the computer to compare a shape and orientation of the input pattern with a shape and orientation of the registered pattern; means for instructing the computer to compute a degree of difference between the orientation of the input pattern and the orientation of the registered pattern; and means for instructing the computer to select a display orientation of a display target corresponding to the input pattern, displayed on the display screen, from a plurality of display orientations determined by a shape of the display screen, based on the computed degree of difference.

BRIEF DESCRIPTION OF THE SEVERAL VIEWS OF THE DRAWING

FIG. 19 is a block diagram illustrating an information processing apparatus according to a fifth modification of the embodiment;

FIG. 20 is a view illustrating a case where the apparent coordinate position intended by a user is made different from the coordinate position of a display screen by a parallax;

FIG. 21 is a view useful in explaining a method for adjusting the parallax using the parallax adjusting unit appearing in FIG. 19.

DETAILED DESCRIPTION OF THE INVENTION

Information processing apparatuses, methods and programs according to an embodiment of the invention and modifications thereof will be described in detail with reference to the accompanying drawings.

Firstly, the outline of an information processing apparatus according to the embodiment will be described. In the information processing apparatus, an input pattern input by a user using a coordinate input unit is compared with a registered pattern to determine the orientation of use by a user, thereby performing image display in accordance with the determined orientation. The input pattern is used to determine the orientation of use, and not to merely designate the orientation of use by the user. As the input pattern, a pattern input for another purpose, such as a signature to be input for personal verification for login, is used. Namely, the embodiment is characterized in that it is not necessary for the user to perform any operation dedicated to designate the orientation of use.

The information processing apparatus, method and program of the embodiment of the invention can determine the orientation of display without any user's operation for designating the orientation.

Figure 1:
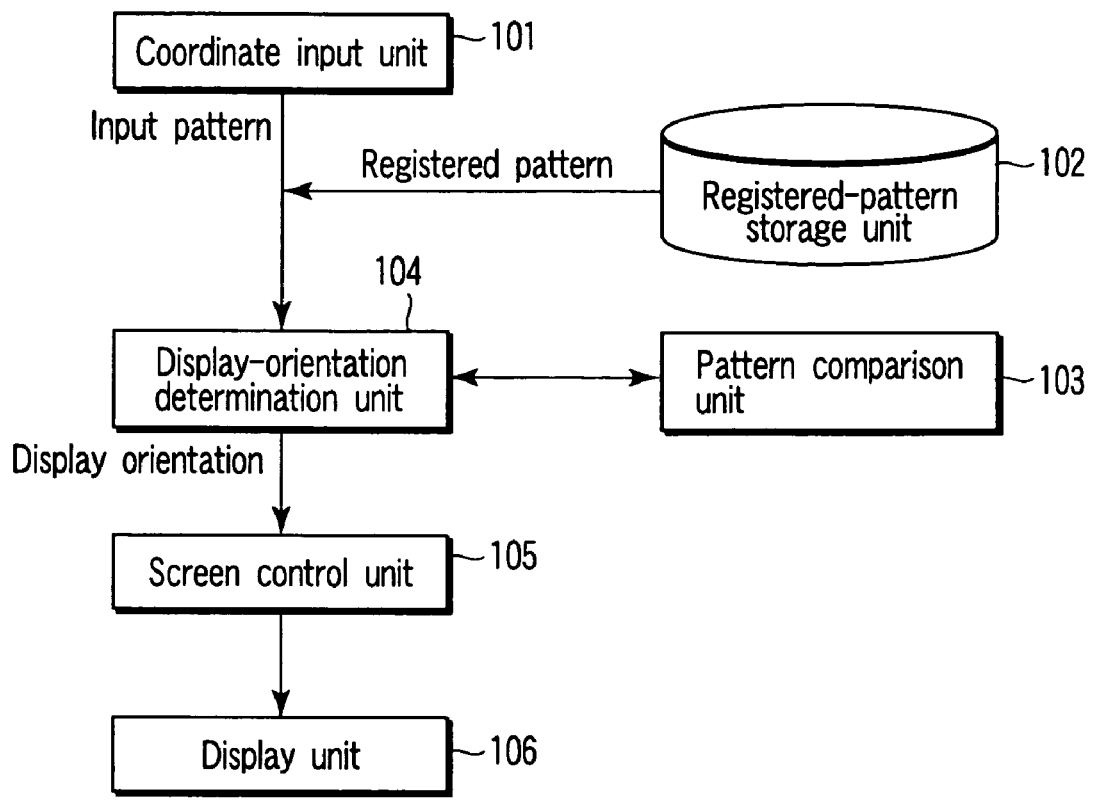
FIG. 1 is a block diagram illustrating an information processing apparatus according to an embodiment of the invention.

Referring now to FIG. 1, an information processing apparatus according to an embodiment of the invention will be described.

As shown, the information processing apparatus of the embodiment comprises a coordinate input unit 101, registered-pattern storage unit 102, pattern comparison unit 103, display-orientation determination unit 104, screen control unit 105 and display unit 106.

The coordinate input unit 101 acquires, as an input pattern, handwriting data input by a user using a pen or their finger. The handwriting data can be expressed as time-series data as follows:

(X[1], Y[1], P[1]), (X[2], Y[2], P[2]), . . . , (X[K], Y[K], P[K])

Figure 2:
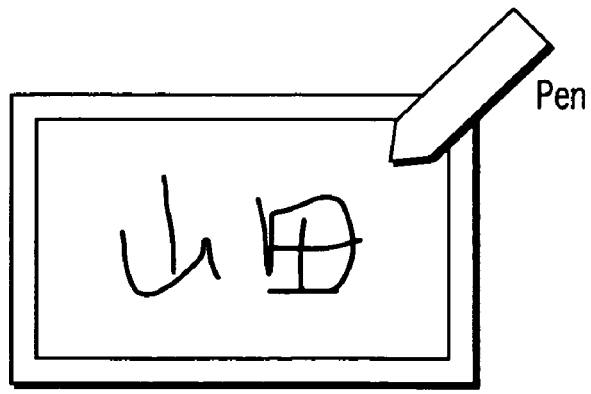
FIG. 2 is a view illustrating a state in which Japanese characters are written on the writing surface of the coordinate input section appearing in FIG. 1.

X[i] and Y[i] indicate two-dimensional coordinates on a writing surface, on which the user writes, for example, characters at time i. The writing surface is connected to the coordinate input unit 101, and the coordinate input unit 101 acquires handwriting data therefrom. The writing surface is, for example, as shown in FIG. 2, on which the user writes, for example, characters using a pen.

P[i] is, for example, writing pressure data. The writing pressure data depends upon the performance of the coordinate input unit 101. Some coordinate input unit 101 acquires data that expresses the intensity of writing pressure in a plurality of stages. Some other coordinate input unit 101 acquires touch data indicating whether the pen touches the writing surface. In the latter case, when the pen touches the writing surface, pressure data of 1 is acquired, while when it does not touch the writing surface, pressure data of 0 is acquired.

The registered-pattern storage unit 102 pre-registers patterns that may be input.

The pattern comparison unit 103 acquires two patterns and compares them in shape and orientation. The pattern comparison unit 103 outputs "TRUE" if it determines that the two patterns have the same shape and orientation, whereas it outputs "FALSE" if it determines that the two patterns do not have the same shape and orientation. The pattern comparison unit 103 may also compare the above-mentioned pressure data to finally determine whether the patterns are identical.

For instance, the pattern comparison unit 103 utilizes, as a pattern comparison method, a character recognition method (see, for example, Jpn. Pat. Appln. KOKAI No. 09-269974) or a signature Verification method (see, for example, "A study on the English Signature Verification Using Tree Matching", IEICE Transactions D-II, Vol. J75-D-II, No. 1, pp. 31-38, January, 1992).

The display-orientation determination unit 104 utilizes the pattern comparison unit 103 to compare an input pattern with a pattern registered in the registered-pattern storage unit 102, and to compute the degree of difference in orientation between the input and registered patterns. From the degree of difference in orientation, the orientation of display is determined. A little difference in rotational angle can be absorbed in the pattern comparison unit. Specific examples for computing the degree of difference between the input and registered patterns and the orientation of display will be described later with reference to FIG. 3. Further, the operation of the display-orientation determination unit 104 will be described later with reference to FIGS. 4, 5 and 6.

The display-orientation determination unit 104 includes a pattern rotation unit (not shown). The pattern rotation unit rotates an input pattern or registered pattern. The display-orientation determination unit 104 computes the rotational angle of the input pattern or registered pattern, and the degree of similarity between the rotated input pattern and registered pattern. If the degree of similarity is higher than a certain threshold value, the orientation of display is computed based on the computed rotational angle. The display-orientation determination unit 104 selects an orientation of the highest similarity from a plurality of orientations of display that are determined by the shape of the information processing apparatus, and determines that the selected orientation is the orientation of display. In general, the number of orientations of display determined by the shape of the information apparatus indicates the number of orientations in which the display screen of the apparatus can be usually positioned in front of the user when they use the apparatus. For instance, in the case of a PDA having a rectangular display screen, it has four orientations of display. As another computation method, the display-orientation determination unit 104 may compute the degrees of similarity between an input pattern and each of the patterns acquired by rotating the corresponding registered pattern through preset rotational angles, thereby determining the rotational angle corresponding to the highest similarity, and computing the orientation of display in accordance with the determined rotational angle.

Assuming that $\theta$ is the rotational angle, the coordinates before rotation is $(x, y, p)$, and the coordinates after rotation is $(x', y', p')$, the pattern rotation unit rotates each pattern to satisfy the following equations:

$$x' = x \cos(\theta) + y \sin(\theta)$$

$$y' = x \sin(\theta) - y \cos(\theta)$$

$$p' = p$$

The screen control unit 105 controls the display unit 106 so that the display unit 106 displays a display target in the orientation of display determined by the display-orientation determination unit 104.

The display unit 106 displays a display target in the orientation of display designated by the screen control unit 105.

Figure 3:
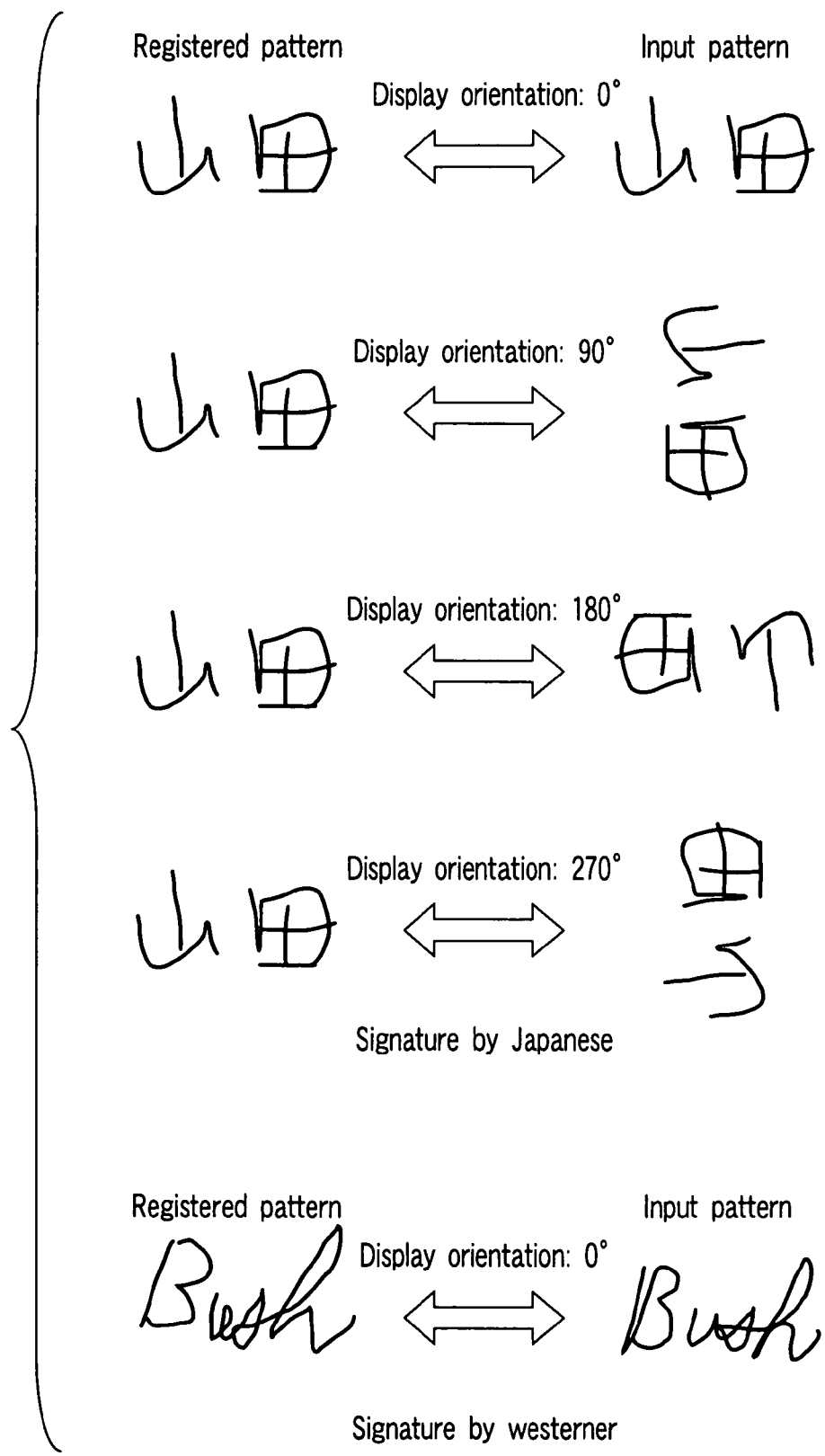
FIG. 3 is a view useful in explaining computation of the orientation of display performed by the display orientation determination unit, appearing in FIG. 1, based on an input pattern and registered pattern.

Referring then to FIG. 3, a description will be given of the case where an appropriate orientation of display is computed from the degree of difference between an input pattern and the corresponding registered pattern.

When a user reads characters in a certain orientation, the display-orientation determination unit 104 sets registered patterns so that they can read and write the characters appropriately. The orientation in which the registered patterns are set is an arbitrary one. The display-orientation determination unit 104 acquires a rotational angle that provides the highest similarity between a pattern input through the coordinate input unit 101 and the corresponding registered pattern. Through the acquired rotational angle, the display-orientation determination unit 104 rotates the registered pattern or input pattern.

In the uppermost and lowermost examples shown in FIG. 3, the rotational angle is 0, and it is not necessary to change the orientation of display of the registered patterns. Further, it is determined whether a to-be-rotated target should be rotated clockwise or counterclockwise. In the examples of FIG. 3, the registered pattern is rotated clockwise. In other words, if the input pattern is rotated, it is rotated counterclockwise. Since thus, the orientation of rotation with respect to the reference pattern is determined, rotational angles of 90° and 270°, for example, provide different meanings. In the second uppermost example in FIG. 3 where the rotational angle is 90°, the input pattern must be rotated counterclockwise through 90°.

Similarly, in the second lowermost example in FIG. 3 where the rotational angle is 270°, the input pattern must be rotated counterclockwise through 270°.

Figure 4:
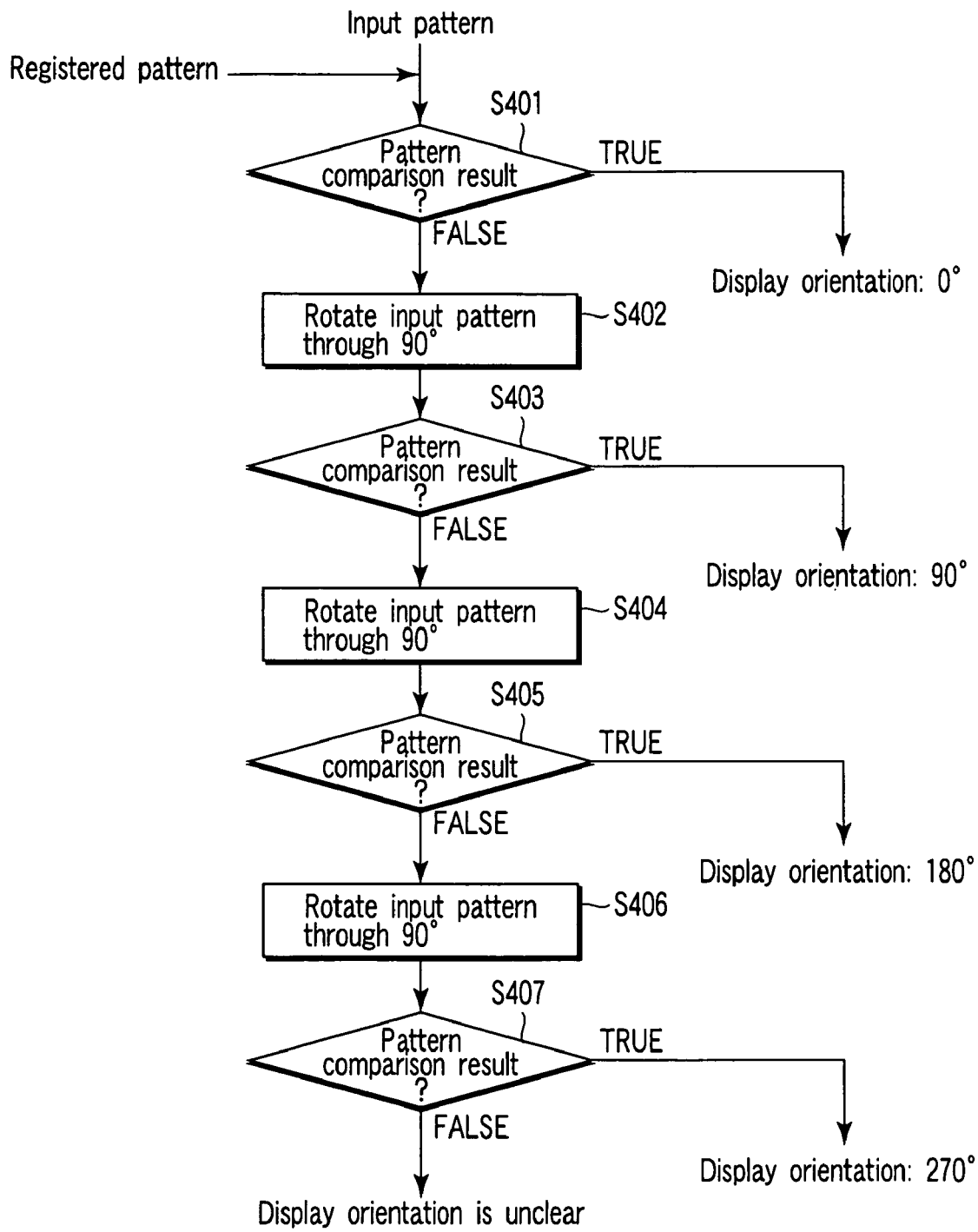
FIG. 4 is a flowchart illustrating an operation example performed by the display orientation determination unit of FIG. 1.

Referring to FIG. 4, an operation example of the display-orientation determination unit 104 will be described.

An input pattern and the corresponding registered pattern are acquired (step S401). It is determined at step S401 that the input and registered patterns are similar to each other, it is determined that the orientation of display is 0°. More specifically, if the similarity between the input and registered patters is higher than a certain threshold value, it is determined that the input and registered patters are similar to each other. In contrast, if the similarity between the input and registered patters is not higher than the certain threshold value, it is determined that the input and registered patters are not similar to each other. In the latter case, the program proceeds to step S402.

The pattern rotation unit rotates the input pattern through 90° (step S402). After that, by the same process as at step S401, the input pattern acquired at step S402 is compared with the registered pattern (step S403). If it is determined at step S403 that the input and registered patterns are similar, it is determined that the orientation of display is 90°. In contrast, if it is determined at step S403 that the input and registered patterns are not similar, the program proceeds to step S405.

The pattern rotation unit further rotates the input pattern through 90° (step S404). After that, by the same process as at step S401, the input pattern acquired at step S404 is compared with the registered pattern (step S405). If it is determined at step S405 that the input and registered patterns are similar, it is determined that the orientation of display is 180°. In contrast, if it is determined at step S405 that the input and registered patterns are not similar, the program proceeds to step S406.

The pattern rotation unit further rotates the input pattern through 90° (step S406). After that, by the same process as at step S401, the input pattern acquired at step S406 is compared with the registered pattern (step S407). If it is determined at step S407 that the input and registered patterns are similar, it is determined that the orientation of display is 270°. In contrast, if it is determined at step S405 that the input and registered patterns are not similar, it is determined that the orientation of display is unclear.

Figure 5:
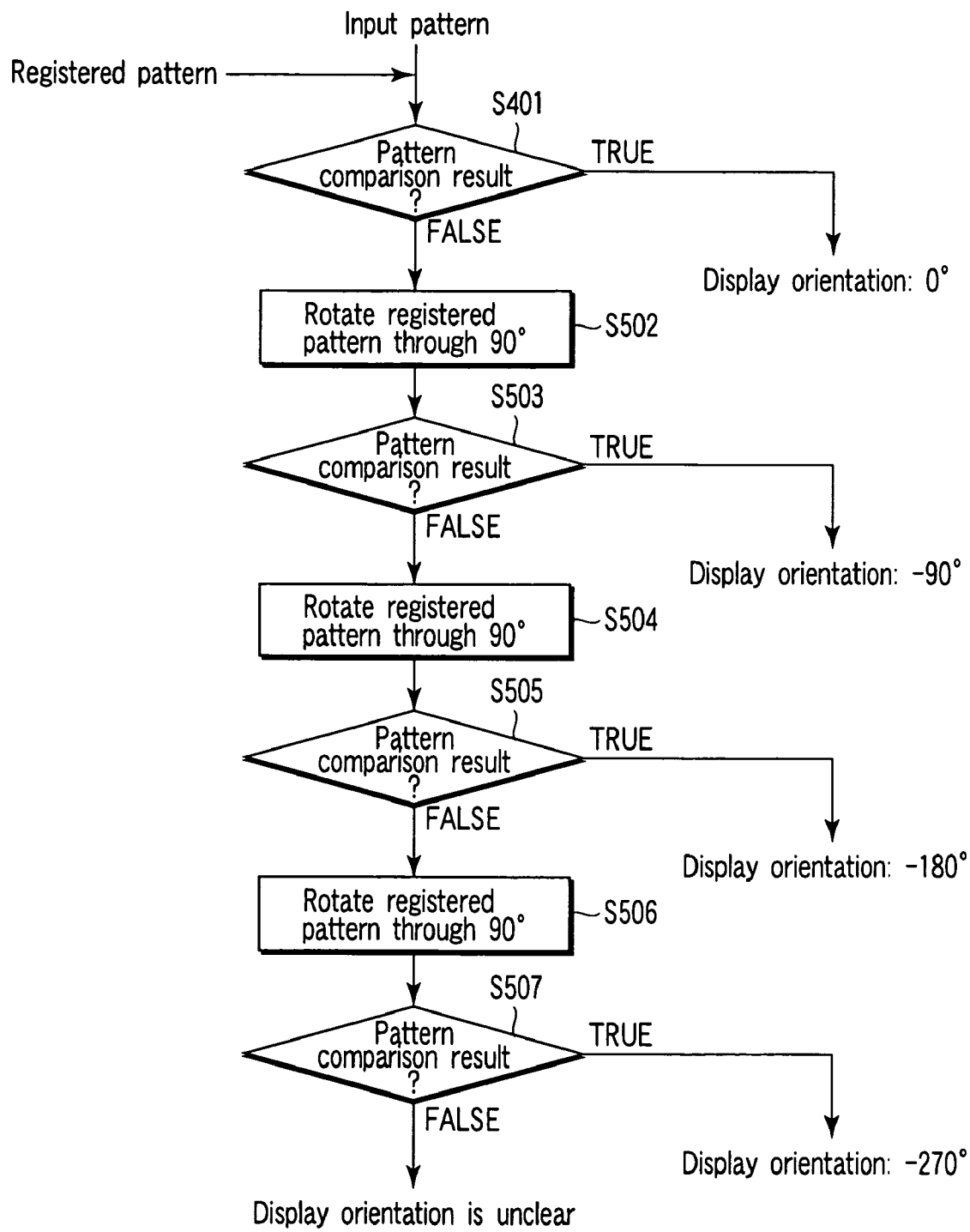
FIG. 5 is a flowchart illustrating another operation example performed by the display orientation determination unit of FIG. 1.

FIG. 5 shows a modification of FIG. 4. In the modification, the pattern rotation unit rotates the registered pattern instead of the input pattern. The first step is similar to step S401.

In the modification, the pattern rotation unit rotates the registered pattern at steps S502, S504 and S506 instead of rotating the input pattern at steps S402, S404 and S406. Thus, the modification is opposite to the case of FIG. 4 in the relative rotational direction of the registered and input patterns. Accordingly, if it is determined at step S503, S505 or S507 that the input and registered patterns are similar to each other, the orientation of display is −90°, −180° or −270°. The other operations of the modification are similar to those of FIG. 4.

Figure 6:
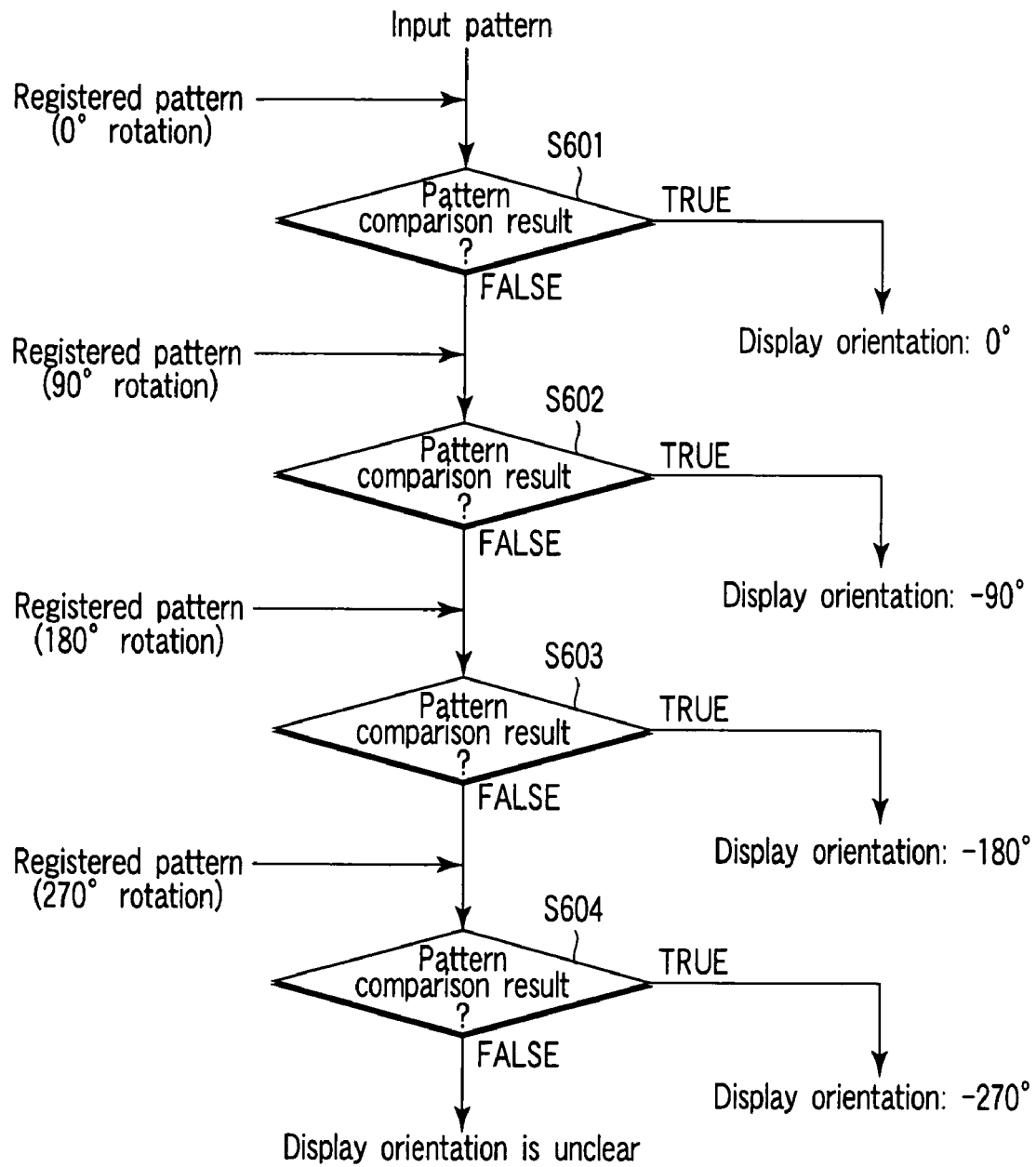
FIG. 6 is a flowchart illustrating yet another operation example performed by the display orientation determination unit of FIG. 1.

FIG. 6 shows a modification of FIG. 5. In this modification, registered patterns corresponding to all rotational angles are acquired before pattern comparison, which differs from the case of FIG. 5 where the pattern rotation unit rotates the registered pattern if the registered pattern is not similar to the input pattern. Specifically, registered patterns corresponding to all rotational angles are computed and stored in the registered-pattern storage unit 102 or another memory (not shown), and the display-orientation determination unit 104 compares the input pattern with each of the corresponding registered patterns, referring to the registered-pattern storage unit 102 or memory (step S601, S602, S603, S604). The other operations performed in the modification of FIG. 6 are similar to those of FIG. 5.

Although in the cases of FIGS. 4, 5 and 6, the orientations of display are limited to four (0°, 90°, 180° and 270°), other orientations may be employed. Namely, if the shape of the information processing apparatus is, for example, a regular triangle instead of a rectangle, it is desirable that three orientations (0°, 120° and 240°) of display be employed.

Figure 7:
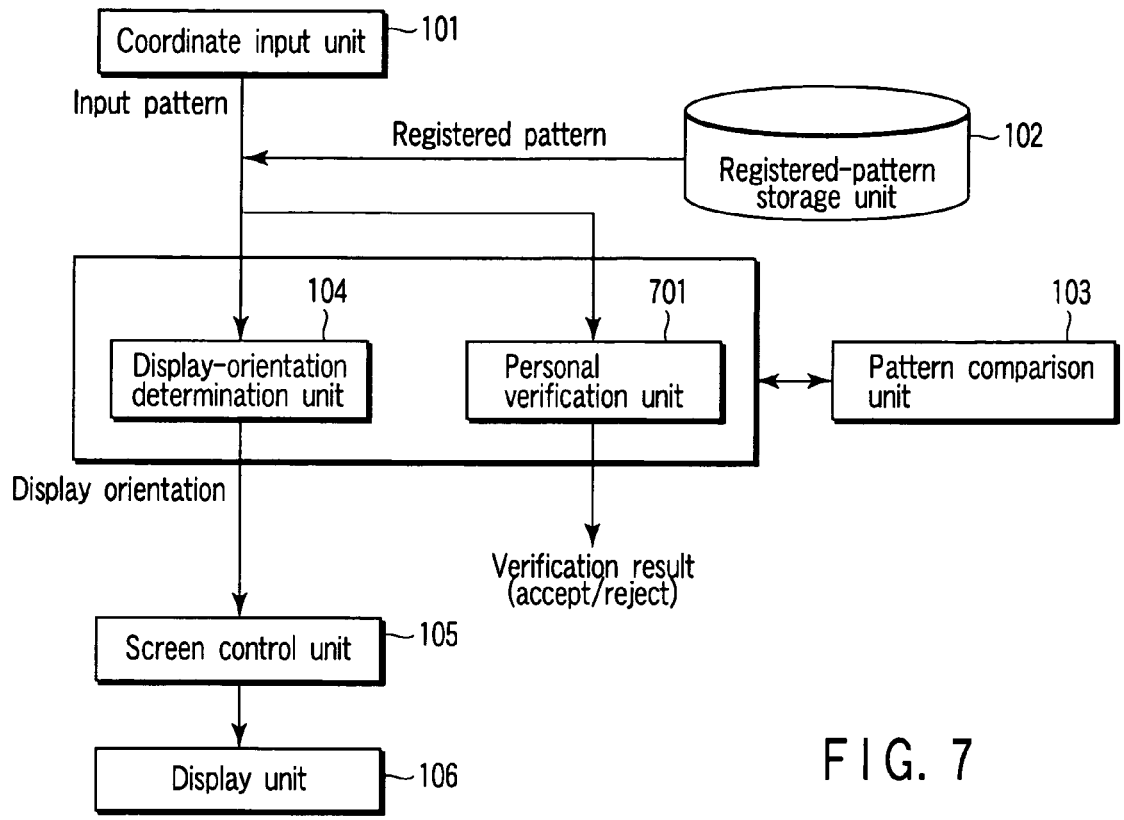
FIG. 7 is a block diagram illustrating an information processing apparatus according to a first modification of the embodiment of the invention.
Figure 8:
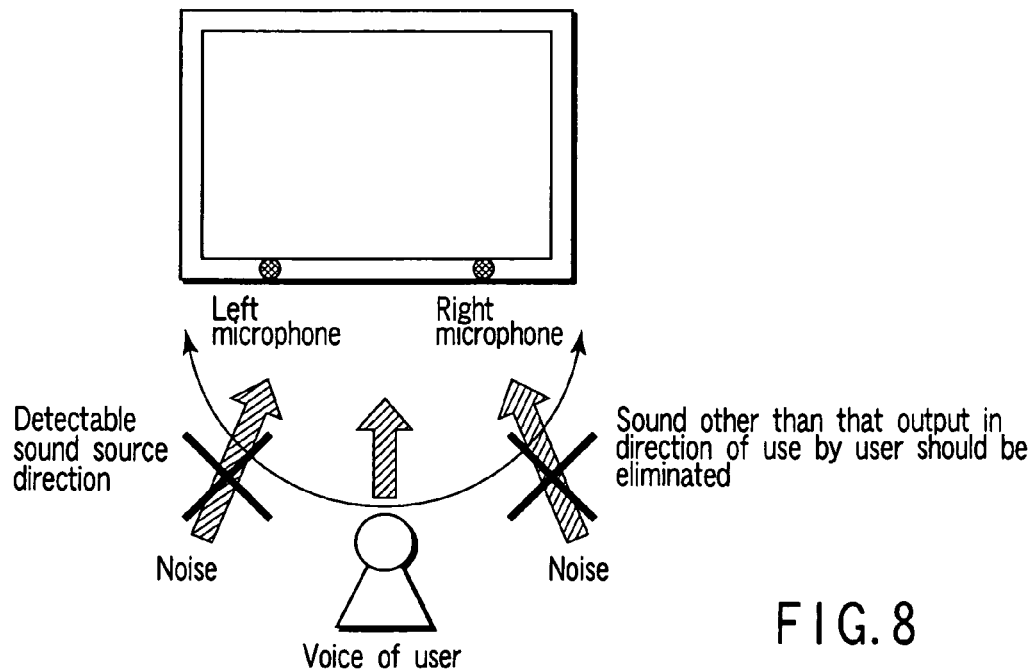
FIG. 8 is a view illustrating the concept of an array of microphones.
Figure 9:
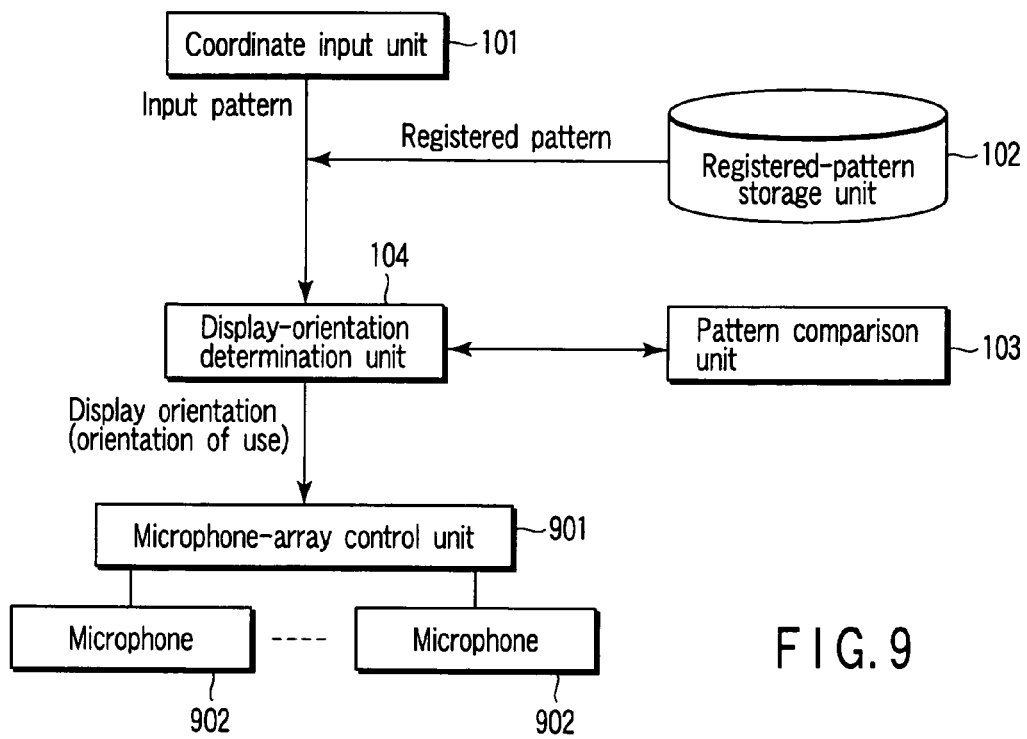
FIG. 9 is a block diagram illustrating an information processing apparatus according to a second modification of the embodiment.

Referring to FIG. 7, a first modification of the information processing apparatus of the embodiment (FIG. 1) will be described.

The first modification differs from the information processing apparatus of FIG. 1 only in that the former additionally employs a personal verification unit 701.

When the signature of a user is input as an input pattern, and the pattern comparison unit 103 outputs a signal (TRUE signal) indicating that the input pattern (signature) is extremely similar to the corresponding one registered in the registered-pattern storage unit 102, the personal verification unit 701 determines that the user is a legitimate one (verification result: acceptance). In contrast, if the pattern comparison unit 103 outputs a signal (FALSE signal) indicating that the input pattern (signature) is not extremely similar to the corresponding registered one, the personal verification unit 701 determines that the user is not a legitimate one (verification result: rejection). Further, it is desirable that the personal verification unit 701 determine whether the input pattern is really the signature of the user, referring to the above-described writing pressure information.

Referring to FIGS. 8, 9, 10 and 11, a second modification of the information processing apparatus of the embodiment (FIG. 1) will be described. The second modification relates to an array of microphones. The information processing apparatus of the second modification comprises a microphone-array control unit 901 and a plurality of microphones 902, as well as the elements shown in FIG. 1.

The microphone array estimates the direction of a sound source, using the microphones (see, for example, Jpn. Pat. Appln. KOKAI No. 10-204790; "Sound System and Digital Signal Processing," pp 173-218 (Seventh Chapter), Corona Publishing, ISBN 4-88552-128-9, March, 1995). In general, to estimate the direction of the sound source, it is necessary to use a plurality of microphones arranged perpendicularly with respect to the direction of the sound source.

In this modification, when it is assumed that the user is present in the direction of the sound source, the microphone-array control unit 901 sets, as the sound source direction, the orientation of display determined by the display-orientation determination unit 104. Further, the microphone-array control unit 901 makes active the microphones 902 arranged perpendicularly with respect to the orientation of display, and can accurately determine the direction of the user from the sound acquired by these microphones 902. If the direction of the user can be accurately determined, the sound (i.e., noise) other than the voice of the user can be reliably eliminated utilizing the orientation of use by the user.

Figure 10:
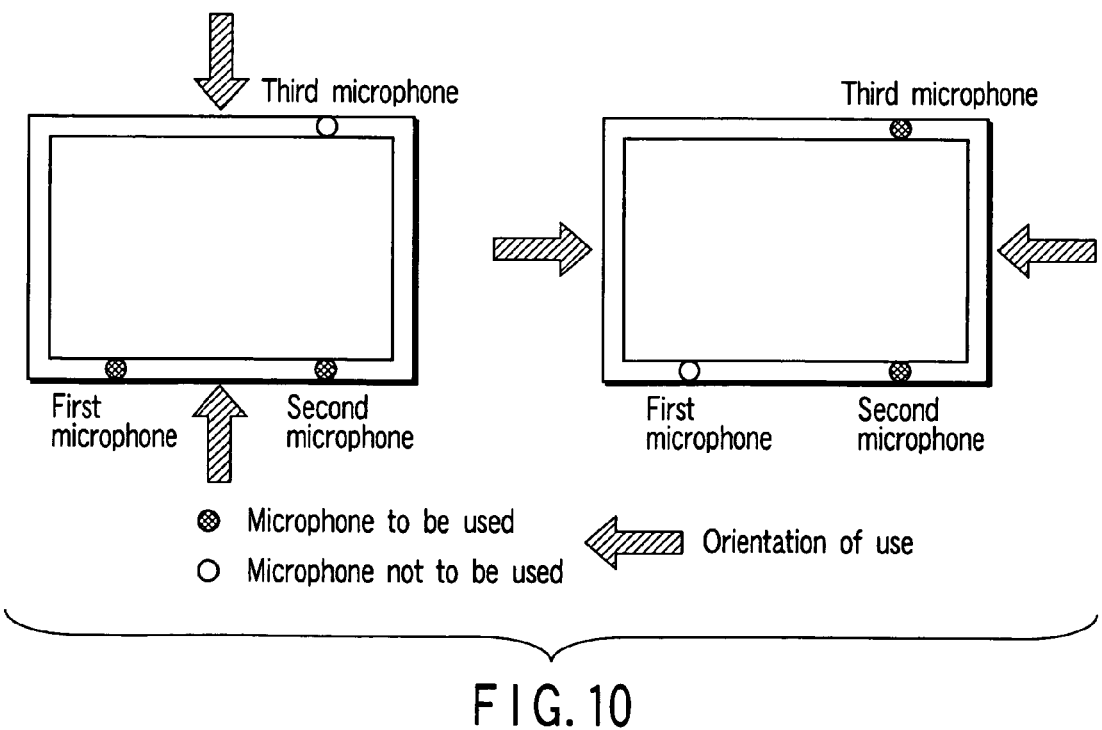
FIG. 10 is a view illustrating the positional relationship between microphones.

Referring to FIG. 10, the microphones 902 to be made active will be described. FIG. 10 shows the relationship between the orientation of use by the user and the positions of the microphones used, assuming that three microphones 902 are provided.

If the orientation of use of the information processing apparatus is the orientation indicated by the upper or lower arrow shown in the left part of FIG. 10, the microphone-array control unit 901 causes the first and second microphones, arranged perpendicularly with respect to the orientation of use, to be used. In contrast, if the orientation of use of the information processing apparatus is the orientation indicated by the left or right arrow shown in the right part of FIG. 10, the microphone-array control unit 901 causes the second and third microphones, arranged perpendicularly with respect to the orientation of use, to be used.

Figure 11:
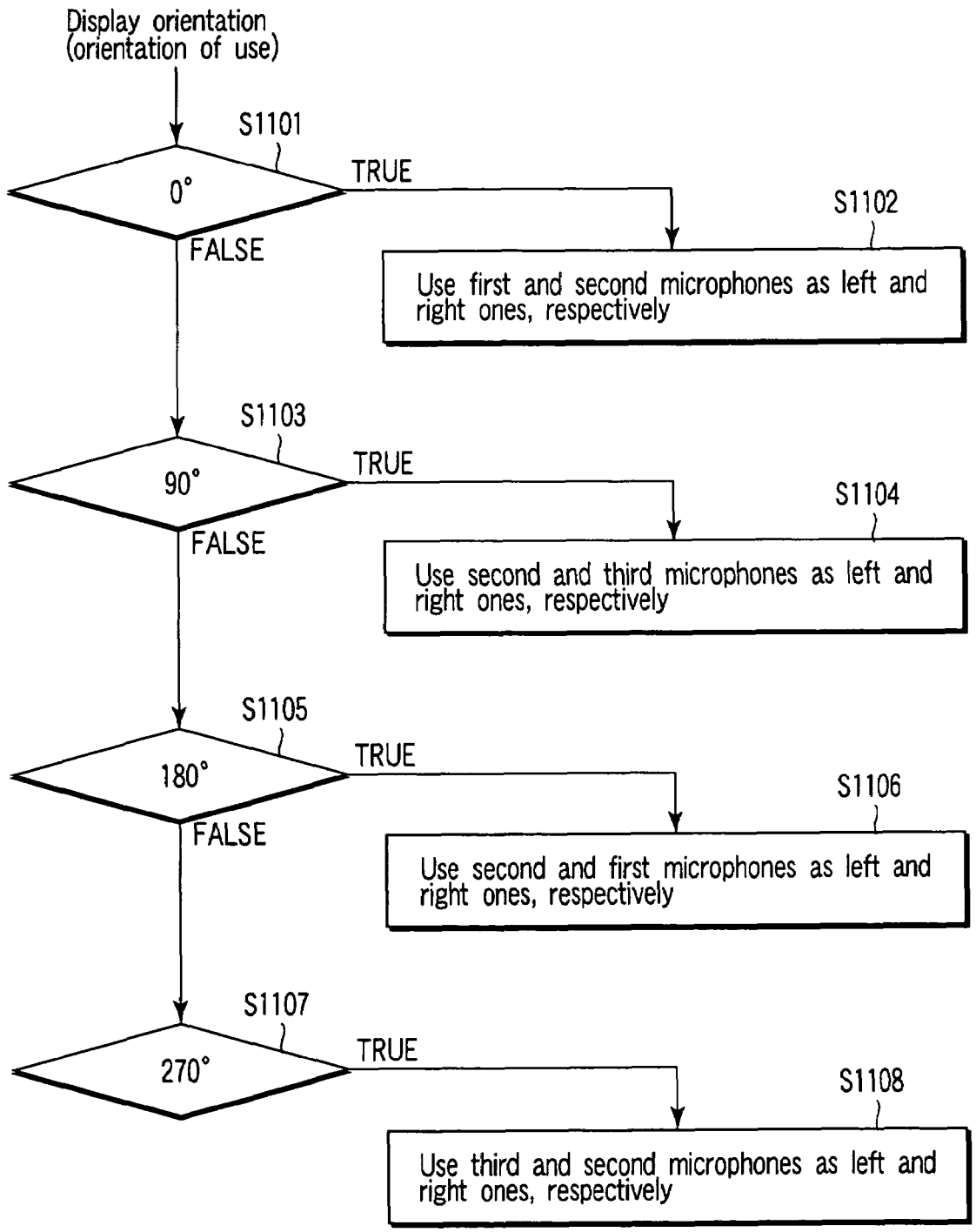
FIG. 11 is a flowchart illustrating an operation example performed by the information processing apparatus of the second modification.

Referring to FIG. 11, a description will be given of an operation example of the information processing apparatus according to the second modification of the embodiment. In the operation example of FIG. 11, assume that the microphones are arranged as shown in FIG. 10. Further, assume that the orientation of use indicated by the lower arrow shown in the left part of FIG. 10 is 0°.

The microphone-array control unit 901 determines whether the orientation of use by the user, i.e., the orientation of display, determined by the display-orientation determination unit 104, is 0° (step S1101) Namely, it is determined whether the signal, the unit 901 refers to, indicates that the orientation determined by the display-orientation determination unit 104 is 0°. If it is determined at step S1101 that the orientation is 0°, the program proceeds to step S1102, whereas it is determined at step S1101 that the orientation is not 0°, the program proceeds to step S1103.

At step S1102, the microphone-array control unit 901 controls the microphones 902 to cause the first and second microphones in FIG. 10 to be used as the left and right microphones, respectively.

Subsequently, step S1101 is executed for all orientations (i.e., the remaining orientations (angles) of 90°, 180° and 270° in this example) (S1103, S1105, S1107). If it is determined to be "TRUE" at each of these steps, the corresponding microphones are used (S1104, S1106, S1108). In contrast, if it is determined to be "FALSE" at each of these steps, the same determination is performed concerning the next angle (S1105, S1107).

The above operations, in which the sound acquired by some of the microphones 902 is referred to, enable the direction of the user to be more accurately detected. Further, since the direction of the user can be more accurately detected, the sound (i.e., noise) other than the voice of the user can be reliably removed utilizing the orientation of use by the user.

Figure 12:
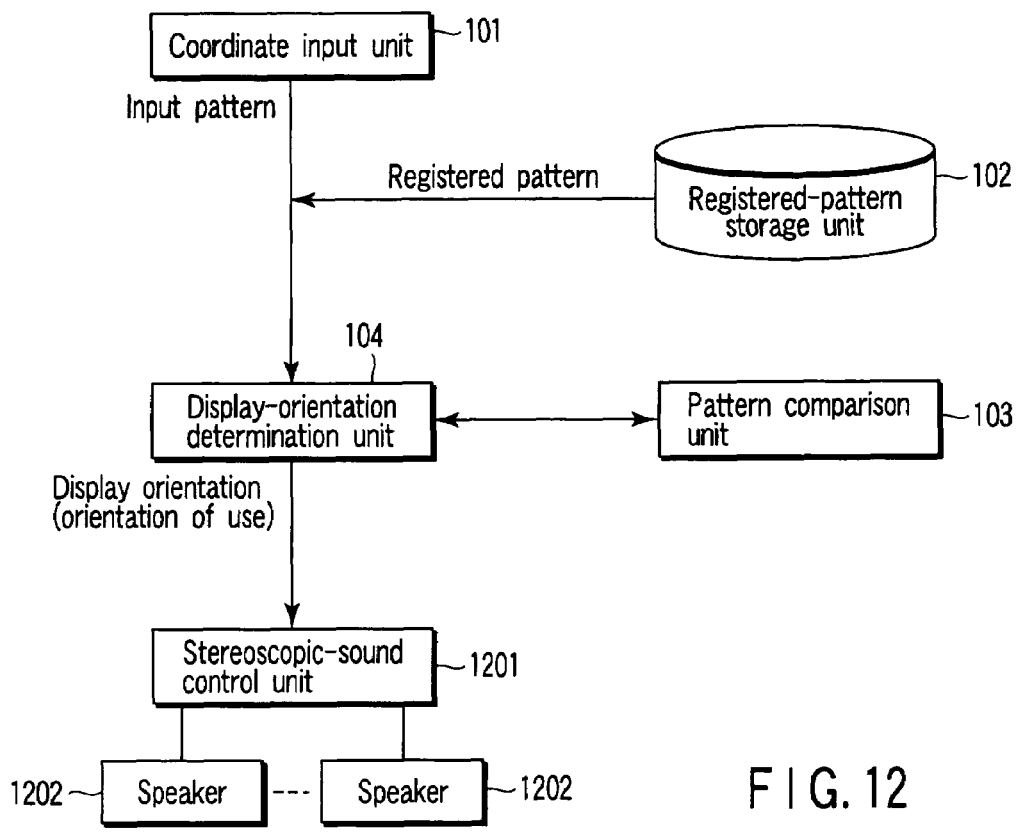
FIG. 12 is a block diagram illustrating an information processing apparatus according to a third modification of the embodiment.
Figure 13:
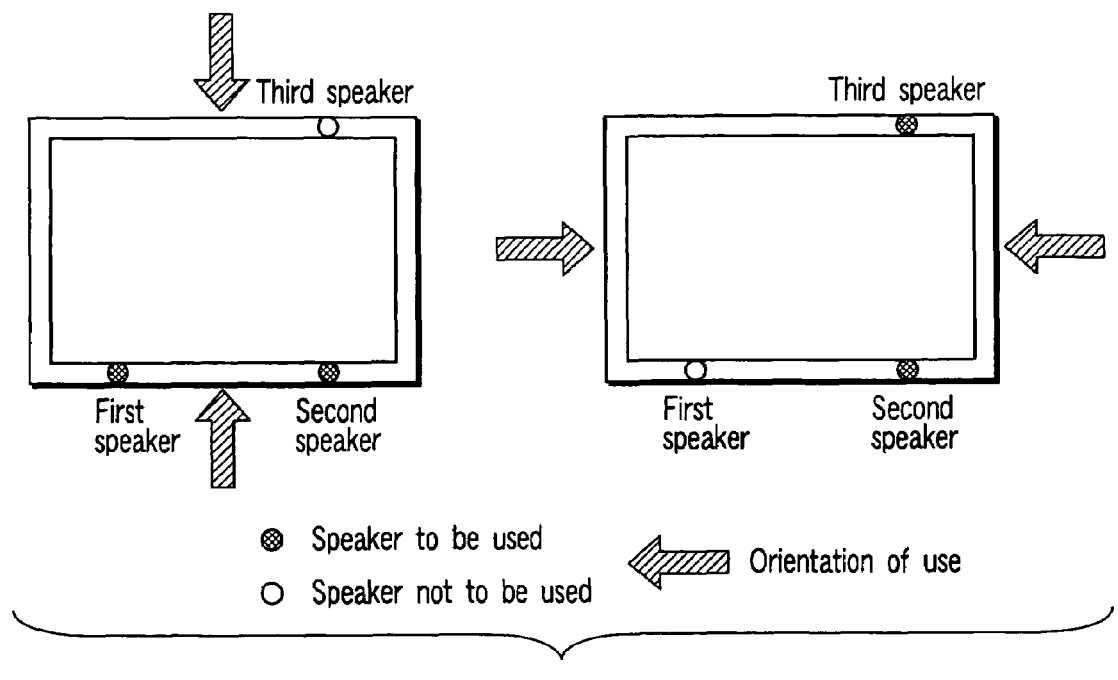
FIG. 13 is a view illustrating the positional relationship between the orientation of use of a user and a speaker used.
Figure 14:
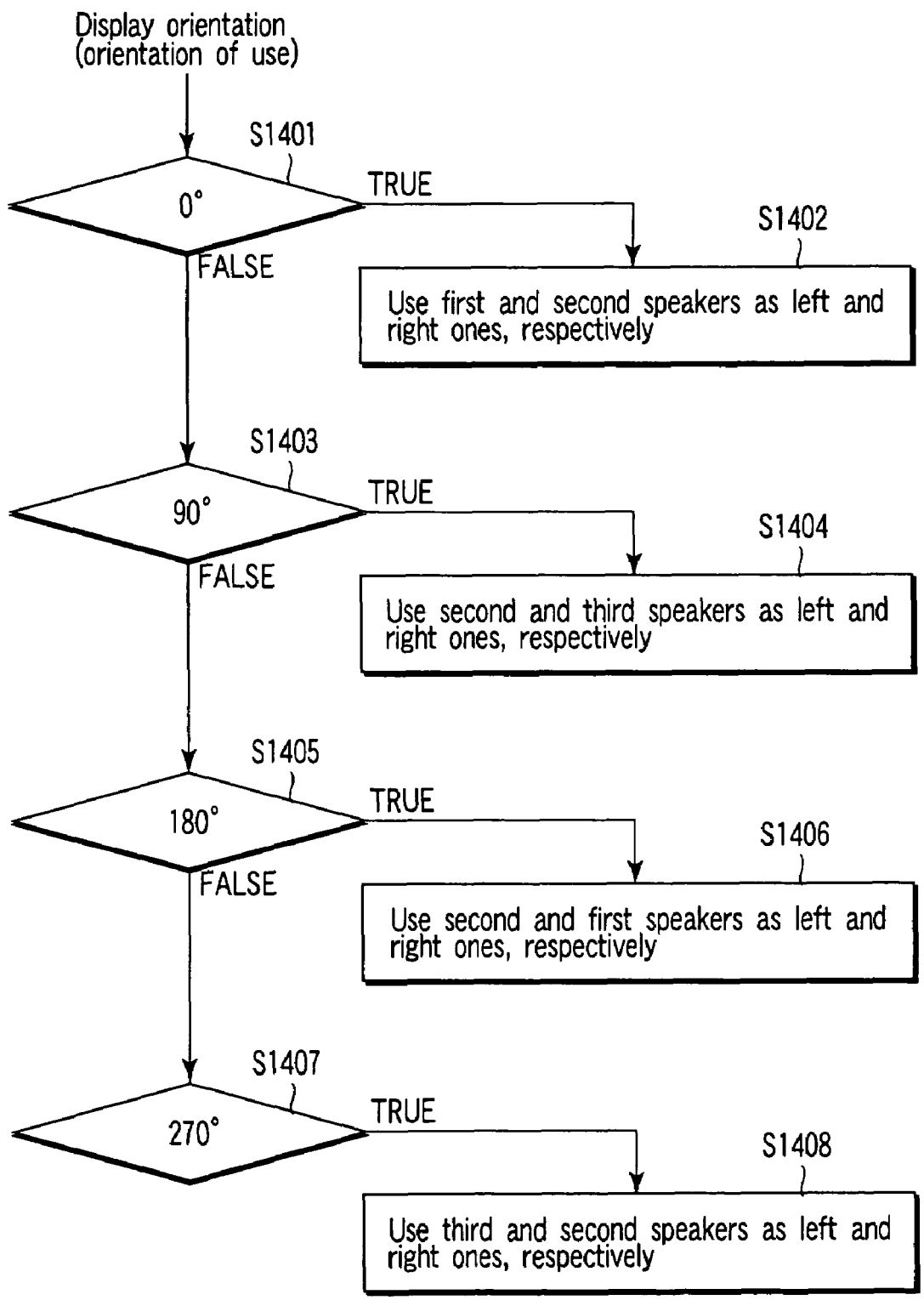
FIG. 14 is a flowchart illustrating an operation example performed by the information processing apparatus of the third modification.
Figure 15:
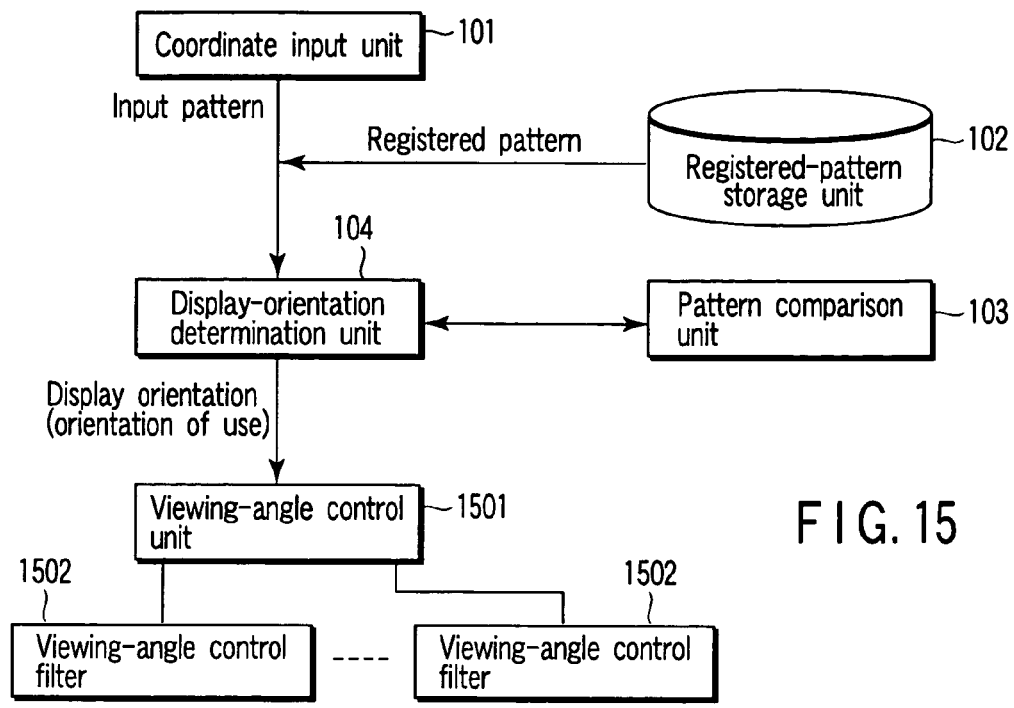
FIG. 15 is a block diagram illustrating an information processing apparatus according to a fourth modification of the embodiment.

Referring to FIGS. 12, 13 and 14, a third modification of the embodiment will be described. The third modification is directed to stereoscopic sound. The information processing apparatus of the third modification comprises a stereoscopic-sound control unit 1201 and a plurality of speakers 1202, as well as the elements shown in FIG. 1.

The stereoscopic-sound control unit 1201 receives information, concerning the orientation of use by the user, supplied from the display-orientation determination unit 104, and selects speakers used in accordance with the orientation of use by the user. To output stereoscopic sound to the user, it is necessary to output sound from a plurality of speakers positioned perpendicularly with respect to the orientation of use by the user. Accordingly, the stereoscopic-sound control unit 1201 selects speakers that are positioned perpendicularly with respect to the orientation of use by the user and should be made active. Further, the stereoscopic-sound control unit 1201 controls the output sound of each selected speaker to provide a stereoscopic sound effect.

Referring to FIG. 13, a description will be given of the speakers 1202 to be made active. FIG. 13 shows the relationship between the orientation of use by the user and the positions of the speakers used, assuming that three speakers 1202 are provided. In this example, the stereoscopic-sound control unit 1201 controls the three speakers to select the two of them that are perpendicular to the orientation of use.

If the orientation of use of the information processing apparatus is the orientation indicated by the upper or lower arrow shown in the left part of FIG. 13, the stereoscopic-sound control unit 1201 causes the first and second speakers, arranged perpendicularly with respect to the orientation of use, to be used. In contrast, if the orientation of use of the information processing apparatus is the orientation indicated by the left or right arrow shown in the right part of FIG. 13, the stereoscopic-sound control unit 1201 causes the second and third speakers, arranged perpendicularly with respect to the orientation of use, to be used.

Referring to FIG. 14, a description will be given of an operation example of the information processing apparatus according to the third modification of the embodiment. In the operation example of FIG. 14, assume that the speakers are arranged as shown in FIG. 13. Further, assume that the orientation of use indicated by the lower arrow shown in the left part of FIG. 13 is 0°.

The stereoscopic-sound control unit 1201 determines whether the orientation of use by the user, i.e., the orientation of display, determined by the display-orientation determination unit 104, is 0° (step S1401). Namely, it is determined whether the signal, the unit 1201 refers to, indicates that the orientation determined by the display-orientation determination unit 104 is 0°. If it is determined at step S1401 that the orientation is 0°, the program proceeds to step S1402, whereas it is determined at step S1401 that the orientation is not 0°, the program proceeds to step S1403.

At step S1402, the stereoscopic-sound control unit 1201 controls the speakers 1202 to cause the first and second speakers in FIG. 13 to be used as the left and right speakers, respectively.

Subsequently, step S1401 is executed for all orientations (i.e., the remaining orientations (angles) of 90°, 180° and 270° in this example) (S1403, S1405, S1407). If it is determined to be "TRUE" at each of these steps, the corresponding speakers are used (S1404, S1406, S1408). In contrast, if it is determined to be "FALSE" at each of these steps, the same determination is performed concerning the next angle (S1405, S1407).

The above operations enable the display-orientation determination unit 104 to accurately determine the orientation of use by the user, therefore enable the stereoscopic-sound control unit 1201 to select appropriate speakers for providing stereoscopic sound to the user.

Referring to FIGS. 15, 16, 17 and 18, a fourth modification of the embodiment will be described. The fourth modification is directed to a viewing-angle control method. The information processing apparatus of the fourth modification comprises a viewing-angle control unit 1501 and a plurality of viewing-angle control filters 1502, as well as the elements shown in FIG. 1.

Each viewing-angle control filter 1502 can switch a certain viewing angle between a wide viewing angle and a narrow viewing angle (see, for example, http://www.toshiba.co.jp/tech/review/2004/08/59_08pdf/rd2.pdf). By switching on and off the viewing-angle control filters 1502, it is possible that display can be seen only in a certain direction.

The viewing-angle control unit 1501 controls switching of the viewing-angle control filters 1502 in accordance with the orientation of display (i.e., the orientation of use by the user) determined by the display-orientation determination unit 104, thereby adjusting the viewing angle. Accordingly, the viewing-angle control unit 1501 can control the viewing-angle control filters 1502 so as to make display invisible in the orientation perpendicular to the orientation of use by the user. The number of the viewing-angle control filters 1502 are determined corresponding to the number of the orientations of display determined by the shape of the information processing apparatus.

Figure 16:
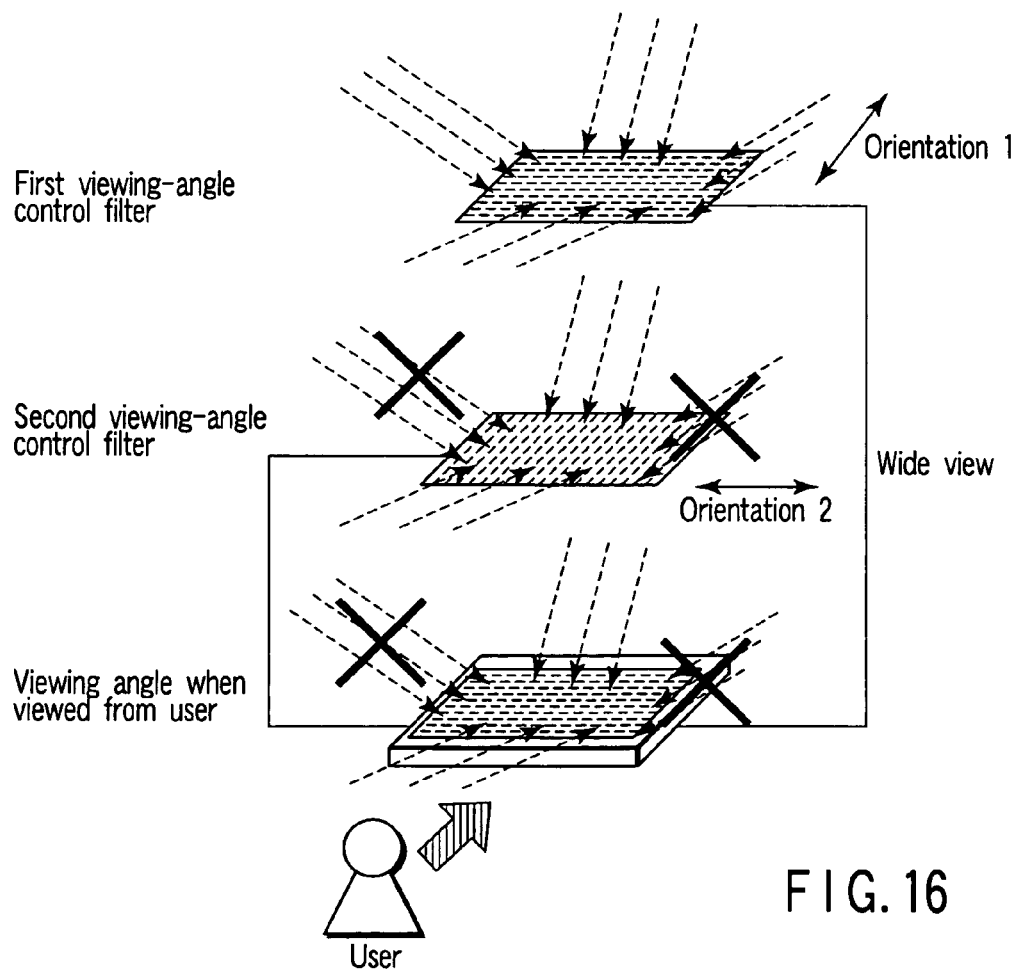
FIG. 16 is a view illustrating a case where only one orientation is made to have narrow eyesight, using the viewing-angle control filters appearing in FIG. 15.
Figure 17:
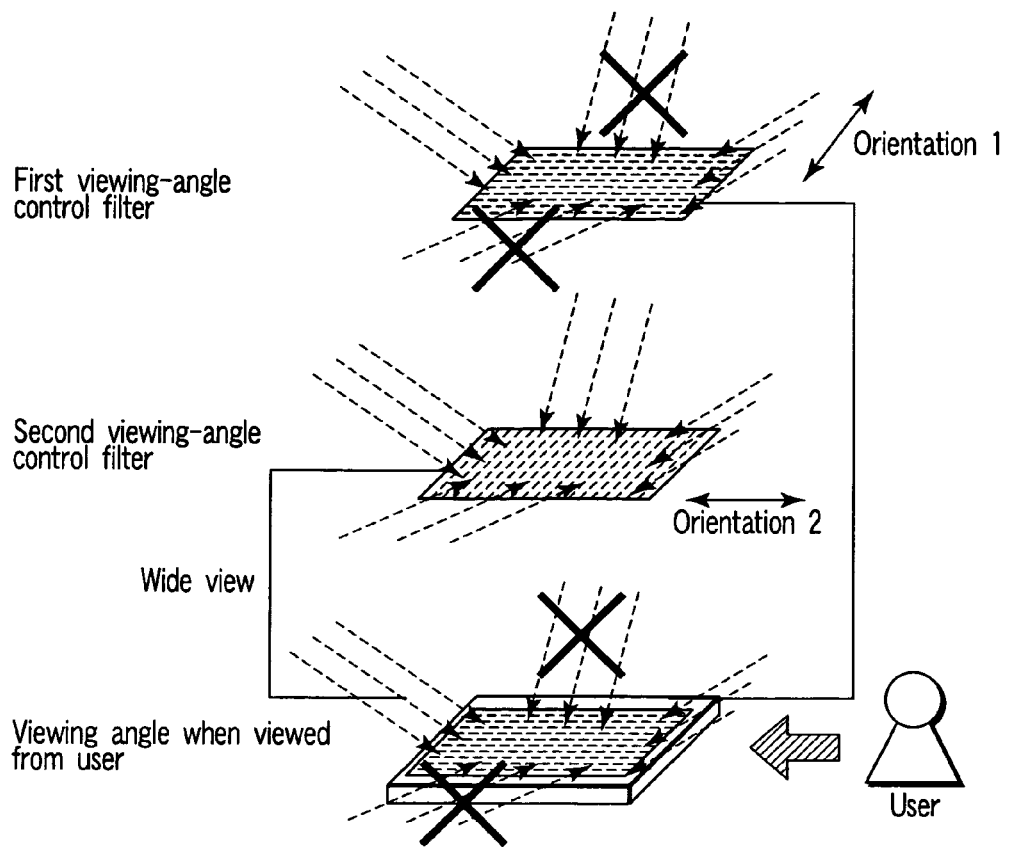
FIG. 17 is a view illustrating a case where one orientation, which differs from the orientation in FIG. 16, is made to have narrow eyesight, using the viewing-angle control filters appearing in FIG. 15.

In the fourth modification, two viewing-angle control filters 1502 are provided on the display screen of the display unit 106 as shown in FIG. 16 or 17. The two viewing-angle control filters 1502 are positioned so that their respective viewing-angle control orientations are perpendicular to each other. Assume here that the viewing-angle control orientation of the first viewing-angle control filter (filter 1 in the following table) is set as orientation 1, and the viewing-angle control orientation of the second viewing-angle control filter (filter 2 in the table) is set as orientation 2. The viewing-angle control unit 1501 controls the first and second viewing-angle control filters to thereby control the viewing angle in the two orientations of the display screen.

TABLE 1

| | Filter 1 | |
|---|---|---|
| Filter 2 | Orientation 1: Wide view | Orientation 1: Narrow view |
| Orientation 2: Wide view | Orientation 1: Wide view<br>Orientation 2: Wide view | Orientation 1: Narrow view<br>Orientation 2: Wide view |
| Orientation 2: Narrow view | Orientation 1: Wide view<br>Orientation 2: Narrow view | Orientation 1: Narrow view<br>Orientation 2: Narrow view |

In the fourth modification, a consideration will be given to the case where a narrow viewing angle is set in only one of the two orientations, since it is desirable to set a wide viewing angle only in the orientation of use by the user. Specifically, the viewing-angle control unit 1501 sets the narrow viewing angle either only in orientation 2 as shown in FIG. 16, or only in orientation 1 as shown in FIG. 17.

In the example of FIG. 16, the viewing-angle control unit 1501 turns on only the second viewing-angle control filter. In this case, since only orientation 2 corresponding to the second viewing-angle control filter is set as a narrow field of view, the user can see display on the display screen in orientation 1. Namely, display on the display screen cannot be seen in orientation 2.

In the example of FIG. 17, the viewing-angle control unit 1501 turns on only the first viewing-angle control filter. In this case, since only orientation 1 corresponding to the first viewing-angle control filter is set as a narrow field of view, the user can see display on the display screen in orientation 2. Namely, display on the display screen cannot be seen in orientation 1.

Thus, the orientation in which display on the display screen can be seen can be controlled by switching on and off the viewing-angle control filters 1502 using the viewing-angle control unit 1501. This function is useful in, for example, preventing display from being seen by any person other than the user.

Figure 18:
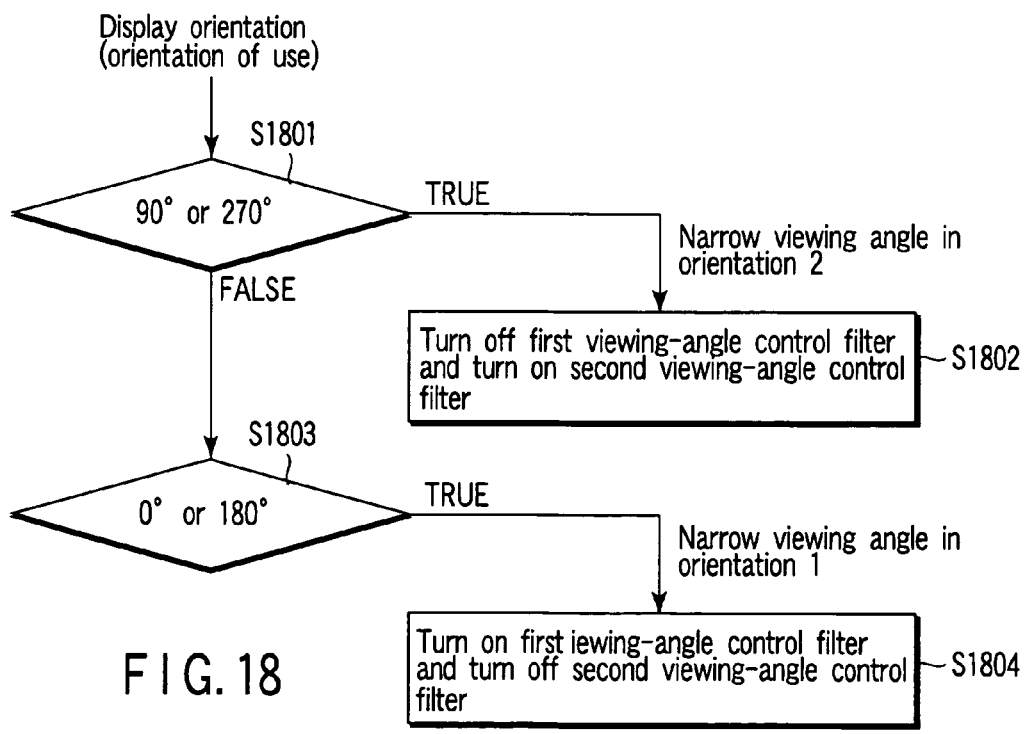
FIG. 18 is a flowchart illustrating an operation example performed by the information processing apparatus of the fourth modification.

Referring to FIG. 18, an operation example of the fourth modification will be described. Assume in the operation example of FIG. 18 that the first and second viewing-angle control filters are provided as shown in FIGS. 16 and 17. Further, if the user is positioned in the position shown in FIG. 17, the orientation of use by the user is set at 0°, while if they are positioned in the position shown in FIG. 16, the orientation of use is set at 270°.

The viewing-angle control unit 1501 determines whether the orientation of use by the user (i.e., the orientation of display) determined by the display-orientation determination unit 104 is one of 90° and 270° (step S1801). Namely, the viewing-angle control unit 1501 performs this determination referring to a signal that indicates whether the orientation determined by the display-orientation determination unit 104 is one of 90° and 270°. If it is determined at step S1801 that the orientation is 90° or 270°, the program proceeds to step S1802, whereas if it is determined at step S1801 that the orientation is neither 90° nor 270°, the program proceeds to step S1803.

At step S1802, the viewing-angle control unit 1501 turns off the first viewing-angle control filter and turns on the second viewing-angle control filter. At this time, only orientation 2 corresponding to the second viewing-angle control filter is set as a narrow field of view.

At step S1803, the viewing-angle control unit 1501 determines whether the orientation of use by the user (i.e., the orientation of display) determined by the display-orientation determination unit 104 is one of 0° and 180°. If the viewing-angle control unit 1501 determines that the orientation of use by the user is 0° or 180°, it turns on the first viewing-angle control filter and turns off the second viewing-angle control filter. At this time, only orientation 1 corresponding to the first viewing-angle control filter is set as a narrow field of view.

Referring to FIGS. 19 to 22, an information processing apparatus according to a fifth modification of the embodiment will be described. The fifth modification is directed to a viewing-angle control method for a display screen using viewing-angle control filters. The information processing apparatus of the fifth modification comprises a parallax adjustment unit 1901, as well as the elements shown in FIG. 1.

If the apparent coordinate position of a target displayed on the screen viewed by a user differs from the actual coordinate position of the target on the display screen of the display unit, the parallax adjustment unit 1901 corrects the apparent coordinate position to the actual coordinate position on the display screen of the display unit. The phenomenon, in which the display screen provides both apparent and actual coordinate positions, may well occur if, for example, the display screen has a film thereon for protecting the screen. When the user obliquely sees the display screen as shown in FIG. 20, the apparent coordinate position seen by the user differs by one point from the actual coordinate position. Therefore, if the pointing position intended by the user may be displaced from the position on the screen surface touched by a pen. The parallax adjustment unit 1901 estimates and adjusts the displacement to provide correct coordinates.

If, for example, the angle between the display screen and the line of sight is θ, the film thickness (i.e., the distance between the display screen and the screen surface) is d, and the parallax is l, as is shown in FIG. 20, the following is established:

$l = d/\tan\theta$

Accordingly, the parallax adjustment unit 1901 adjusts the horizontal position of a point, pointed by the user, by l computed from the equation. The parallax adjustment unit 1901 acquires, from the display-orientation determination unit 104, information indicating where the user is positioned with respect to the display screen. In the example of FIG. 21, it is sufficient if the parallax adjustment unit 1901 shifts the point by +l in the X-axis orientation (i.e., adjusts the parallax in the plus X-axis orientation).

Figure 22:
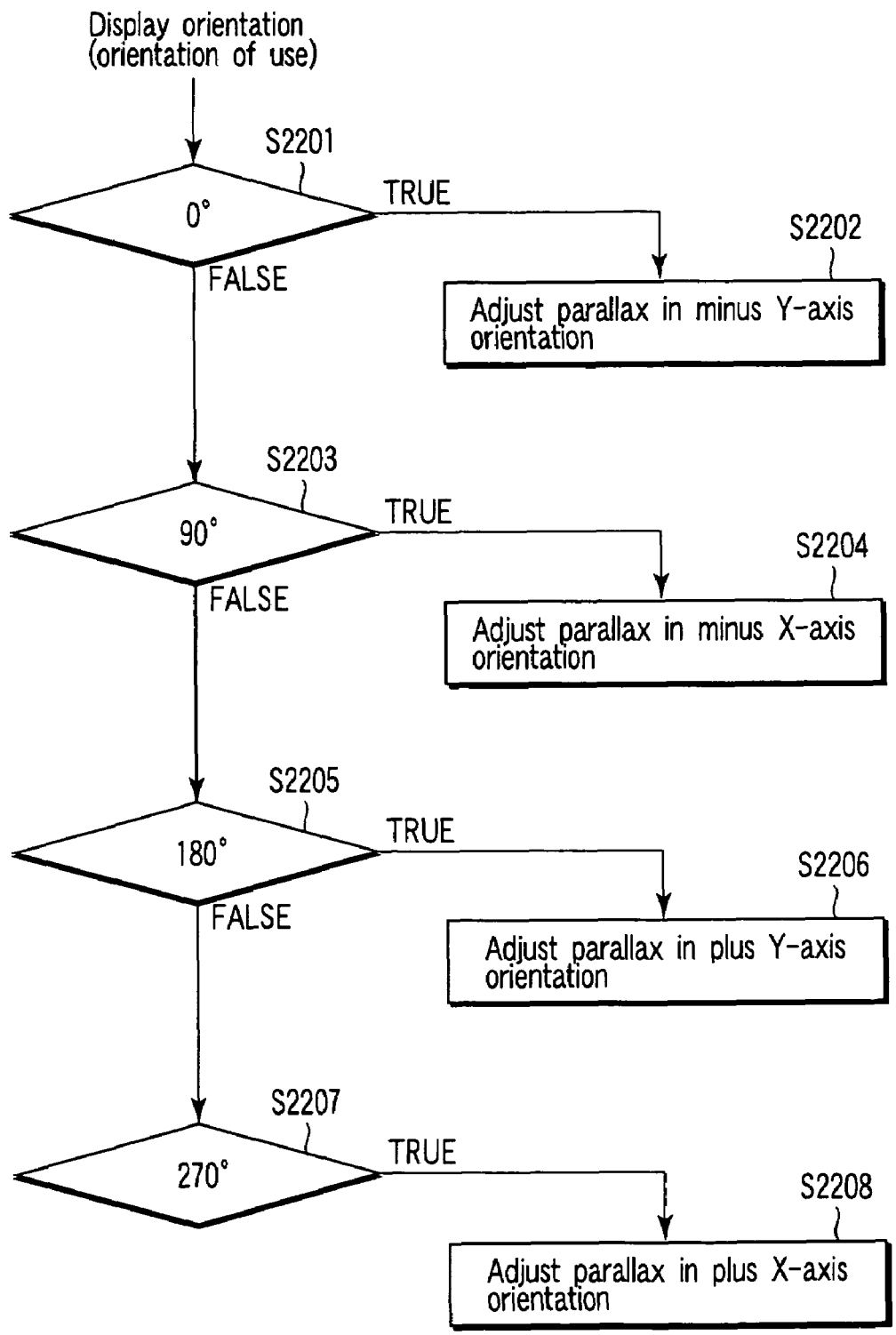
FIG. 22 is a flowchart illustrating an operation example performed by the information processing apparatus of the fifth modification.

Referring to FIG. 22, an operation example of the fifth modification will be described. Assume here that the display unit 106 has such a display screen as shown in FIG. 21, and the user is positioned vertically with respect to one of the sides of the display screen. Further, assume that the orientation of use by the user positioned in the position shown in FIG. 16 is set as 0°. In this case, the position of the user shown in FIG. 21, for example, corresponds to 270°.

The parallax adjustment unit 1901 determines whether the orientation of use by the user (i.e., the orientation of display) is 0° (step S2201). Namely, it is determined whether the signal, the unit 1901 refers to, indicates that the orientation determined by the display-orientation determination unit 104 is 0°. If it is determined at step S2201 that the orientation is 0°, the program proceeds to step S2202, whereas it is determined at step S2201 that the orientation is not 0°, the program proceeds to step S2203.

At step S2202, the parallax adjustment unit 1901 computes l, and shifts the coordinate by −l in the Y-axis orientation (i.e., adjusts the parallax in the minus Y-axis orientation). To compute l, the film thickness d and angle θ are necessary. The film thickness d is determined when the display unit is manufactured, and the angle θ is determined, in a narrow sense, from the positions of the eyes of the user relative to the display screen. An angle-setting unit (not shown) that enables the user to set an angle may be employed. Usually, however, the angle θ is preset from the estimated average users at the manufacture of the display unit.

After that, step S2201 is executed for all orientations (i.e., the remaining orientations (angles) of 90°, 180° and 270° in this example) (S2203, S2205, S2207). If it is determined to be "TRUE" at each of these steps, the parallax adjustment unit 1901 adjusts the parallax in the corresponding orientation (S2204, S2206, S2208). In contrast, if it is determined to be "FALSE" at each of these steps, the same determination is performed concerning the next angle (S2205, S2207).

By virtue of the above-described operation, when a parallax occurs due to the film provided on the display screen, it can be corrected based on the orientation of use by the user accurately determined by the display-orientation determination unit 104.

The flow charts of the embodiments illustrate methods and systems according to the embodiments of the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block of blocks. The computer program instructions may also be loaded onto a computer or other programmable apparatus to cause a series of operational steps to be performed on the computer or other programmable apparatus to produce a computer programmable apparatus provide steps for implementing the functions specified in the flowchart block or blocks.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
   a display acquisition unit including a display screen which displays information to a user, and an acquisition unit configured to acquire an input pattern written by the user;
   a storage unit which prestores, as a registered pattern, a pattern corresponding to the input pattern;
   a comparison unit configured to compare a shape and orientation of the input pattern with a shape and orientation of the registered pattern;
   a computation unit configured to compute a degree of difference between the orientation of the input pattern and the orientation of the registered pattern; and
   a selection unit configured to select a display orientation of a display target corresponding to the input pattern, displayed on the display screen, from a plurality of display orientations determined by a shape of the information processing apparatus, based on the computed degree of difference.

2. The apparatus according to claim 1, further comprising a determination unit configured to determine whether the user is a legitimate one, based on a comparison result output from the comparison unit.

3. The apparatus according to claim 1, wherein:
   the computation unit further includes a rotation unit configured to rotate the input pattern through an angle determined by the shape of the information processing apparatus, to generate a rotated input pattern; and
   the comparison unit compares the rotated input pattern with the registered pattern.

4. The apparatus according to claim 1, wherein:
   the computation unit further includes a rotation unit configured to rotate the registered pattern through an angle determined by the shape of the information processing apparatus, to generate a rotated registered pattern; and
   the comparison unit compares the rotated registered pattern with the input pattern.

5. The apparatus according to claim 1, wherein:
   the computation unit further includes a rotation unit configured to rotate the registered pattern through each of a plurality of angles determined by the shape of the information processing apparatus, to generate a plurality of rotated registered patterns;
   the storage unit stores the rotated registered patterns corresponding to the input pattern; and
   the comparison unit compares each of the rotated registered patterns with the input pattern.

6. The apparatus according to claim 1, further comprising a correction unit configured to correct, by rotating the display screen an apparent coordinate position of the display target to a correct coordinate position of the display target, based on the selected display orientation, if the apparent coordinate position fails to be identical to the correct coordinate position, the apparent coordinate position being acquired when the user views the display target on the display screen.

7. The apparatus according to claim 1, further comprising:
   a plurality of microphones arranged vertically with respect to the display orientations determined by the shape of the information processing apparatus; and
   a selection unit configured to select several of the microphones, which are arranged vertically with respect to the selected display orientation.

8. The apparatus according to claim 1, further comprising:
   a plurality of speakers arranged vertically with respect to the display orientations determined by the shape of the information processing apparatus;
   a selection unit configured to select several of the speakers, which are arranged vertically with respect to the selected display orientation; and
   a control unit configured to control volume of sound output from the selected speakers.

9. The apparatus according to claim 1, further comprising:
   a plurality of viewing-angle control filters arranged on the display screen in accordance with the display orientations; and
   a control unit configured to control the viewing-angle control filters in accordance with the selected display orientation.

10. An information processing method comprising:
    preparing a display acquisition unit which includes a display screen displaying information to a user, and an acquisition unit configured to acquire an input pattern written by the user;
    preparing a storage unit which prestores, as a registered pattern, a pattern corresponding to the input pattern;
    comparing a shape and orientation of the input pattern with a shape and orientation of the registered pattern;
    computing a degree of difference between the orientations of the input pattern and the orientation of the registered pattern; and
    selecting a display orientation of a display target corresponding to the input pattern, displayed on the display screen, from a plurality of display orientations determined by a shape of the information processing apparatus, based on the computed degree of difference.

11. The method according to claim 10, further comprising determining whether the user is a legitimate one, based on a comparison result by comparing a shape and orientation.

12. The method according to claim 10, wherein:
    computing the degree of difference further includes rotating the input pattern through an angle determined by the shape of the information processing apparatus, and generating a rotated input pattern; and
    comparing the shape and orientation compares the rotated input pattern with the registered pattern.

13. The method according to claim 10, wherein:
    computing the degree of difference further includes rotating the registered pattern through an angle determined by the shape of the information processing apparatus, and generating a rotated registered pattern; and
    comparing the shape and orientation compares the rotated registered pattern with the input pattern.

14. The method according to claim 10, wherein:
    computing the degree of difference further includes rotating the registered pattern through each of a plurality of angles determined by the shape of the information processing apparatus, and generating a plurality of rotated registered patterns;
    the storage unit stores the rotated registered patterns corresponding to the input pattern; and
    comparing the shape and orientation compares each of the rotated registered patterns with the input pattern.

15. The method according to claim 10, further comprising correcting an apparent coordinate position of the display target to a correct coordinate position of the display target, based on the selected display orientation, if the apparent coordinate position fails to be identical to the correct coordinate position, the apparent coordinate position being acquired when the user views the display target on the display screen.

16. The method according to claim 10, further comprising:
preparing a plurality of microphones arranged vertically with respect to the display orientations; and
selecting several of the microphones, which are arranged vertically with respect to the selected display orientation.

17. The method according to claim 10, further comprising:
preparing a plurality of speakers arranged vertically with respect to the display orientations;
selecting several of the speakers, which are arranged vertically with respect to the selected display orientation; and
controlling volume of sound output from the selected speakers.

18. The method according to claim 10, further comprising:
preparing a plurality of viewing-angle control filters arranged on the display screen in accordance with the display orientations; and
controlling the viewing-angle control filters in accordance with the selected display orientation.

19. A computer program stored in a computer readable medium comprising:
means for instructing a computer to display information on a display screen for a user, and to acquire an input pattern written on the display screen by the user;
means for instructing the computer to prestore, as a registered pattern, a pattern corresponding to the input pattern;
means for instructing the computer to compare a shape and orientation of the input pattern with a shape and orientation of the registered pattern;
means for instructing the computer to compute a degree of difference between the orientation of the input pattern and the orientation of the registered pattern; and
means for instructing the computer to select a display orientation of a display target corresponding to the input pattern, displayed on the display screen, from a plurality of display orientations determined by a shape of the display screen, based on the computed degree of difference.

* * * * *